July 5, 1960             H. NELTING            2,943,480
ARRANGEMENT FOR CHECKING THE ZERO CONSTANCY OF
WHEATSTONE IMPEDANCE MEASURING BRIDGES
Filed Nov. 21, 1956

INVENTOR
HEINZ NELTING
BY Fred M Vogel
AGENT

United States Patent Office 2,943,480
Patented July 5, 1960

2,943,480

ARRANGEMENT FOR CHECKING THE ZERO CONSTANCY OF WHEATSTONE IMPEDANCE MEASURING BRIDGES

Heinz Nelting, Hamburg, Germany, assignor, by mesne assignments, to North American Philips Company, Inc., New York, N.Y., a corporation of Delaware Filed Nov. 21, 1956, Ser. No. 623,622

Claims priority, application Germany Feb. 22, 1956

4 Claims. (Cl. 73—88.5)

The present invention relates to circuit arrangements for checking the zero constancy of a Wheatstone bridge. More particularly, the invention relates to circuit arrangements for checking the zero constancy of Wheatstone impedance measuring bridges in which the impedances are arranged in pairs, the impedances of each pair being equal and/or subjected to the same variation.

In order to measure mechanical deformations, use is frequently made of strain gauges which are attached to the part to be deformed by an adhesive, the change in resistance of these gauges being dependent upon the change in length of the part. In taking measurements on parts which, when loaded, are subjected at different points or in different directions not only to compressive stresses, but also to equal tensile stresses, so that an elongation is associated with a certain contraction the strain gauges can be attached at these points and connected in a measuring bridge. In such a bridge, the errors which may be due to the leads can be eliminated. The influence of temperature is also eliminated, since the gauges in the bridge assume the same temperature. In addition, the bridge provides an output voltage which exceeds that produced by a single strain gauge.

It is an object of the invention to enable the zero constancy to be checked without the mechanical deformation being required to be undone. This is particularly advantageous in measuring the torsion of rotating shafts, for example marine screw propeller shafts, and in measuring the roll pressure of rolling mills. In the first case, the shaft need not be stopped and in the second case the pressure can be maintained.

This problem is solved by changing over the Wheatstone measuring bridge to a testing bridge. The bridge comprises four strain gauges arranged in two pairs, each pair being mechanically stressed in the same manner so that the electrical values of the two gauges forming a pair vary in the same manner. In the measuring bridge, the strain gauges are connected so that, viewed from the supply terminals of the bridge, two strain gauges deformed in different manners are connected in series. Furthermore, two differently deformed strain gauges are connected to each supply terminal. These two series-combinations are connected in parallel and the measuring voltage is taken as a diagonal voltage from the junctions at the center of each series-combination. According to the invention, the problem stated hereinbefore is solved in that by means of a change-over device the impedances can be changed over into a second testing bridge arrangement so that they produce a diagonal voltage only if their electrical normal values have changed while the changes to be measured cancel one another. The zero constancy is checked between the central junctions of the two equally deformed strain gauges of each series-combination. A diagonal voltage can be produced between these two points only if the normal values of at least one of the strain gauges or of the balancing elements of the bridge have changed. Obviously, the measuring bridge can be changed over into the testing bridge by connecting the common point of each pair of equally deformed strain gauges to one of the supply terminals for checking the zero constancy. In this arrangement, the points from which the diagonal voltage is taken are the junctions between two differently deformed strain gauges. In both cases, the change-over can be effected by means of one or more relays. In order to operate such a change-over device, two additional slip rings are provided on the rotating shaft, the energizing current being supplied to the change-over device through these slip rings. Alternatively, use may be made of the slip rings associated with the bridge if the relay is operated by a carrier-frequency current, the frequency of which is sufficiently different from the frequency of the bridge supply voltage. Finally, the change-over device may be operated by direct-voltage pulses which are supplied through the slip rings of the measuring bridge or by electromagnetic means.

The balancing elements for balancing the bridge form part of the bridge. With large shafts, for example marine screw propeller shafts, these balancing elements may be so designed that they can be remotely controlled. Thus, there is no need to stop the shaft in order to balance the bridge. In this arrangement also, the balancing elements are preferably operated by means of carrier-frequency current, a direct current or direct-current pulses. In this event, the slip rings of the measuring bridge are used as the supply members. This provides the additional advantage that the correction in the measuring bridge can be made during rotation of the shaft at even the slightest zero variation, whereas in the known methods the shaft is stopped and the bridge is balanced only after an intolerable zero variation has occurred.

In addition, such an arrangement enables the influence of the slip rings to be continuously controlled and to be compensated, for example, by varying the supply voltage. Thus, with constant supply voltage, a definite degree of unbalance introduced into the previously balanced bridge must cause the diagonal voltage to assume a predetermined value, provided that the electrical values of the slip rings, leads, and so on, have not changed. If this value of the diagonal voltage, which corresponds to the definite degree of unbalance, is not attained, the electric values of the leads outside the bridge must have changed. This will give rise to an error in the deformation measurement, even if the measuring bridge is balanced, and this error can be eliminated, for example, if the contact resistances of the slip rings should have been increased, by increasing the supply voltage.

In order that the invention may be readily carried into effect, it will now be described, by way of example, with reference to the accompanying diagrammatic drawings, in which.

Figure 1:
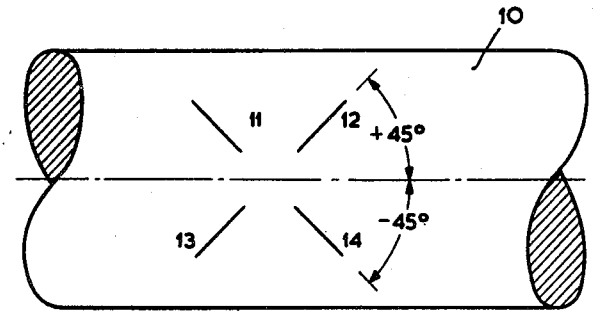
Fig. 1 shows the arrangement of the strain gauges on a shaft.
Figure 2:
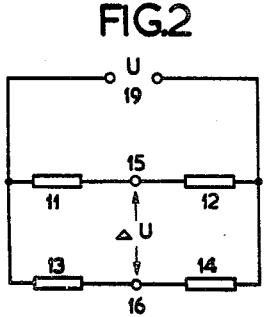
Fig. 2 is a schematic diagram of an embodiment of a measuring bridge arrangement of the strain gauges shown in Fig. 1.

In Fig. 1, in order to measure the torsion and hence the torque of a shaft 10, four strain gauges 11, 12, 13 and 14 are attached to the circumference of the shaft so that two gauges 12, 13 are at an angle of +45° to the axial direction and two gauges 11, 14 at an angle of —45° thereto. When there is torsion in the shaft, the strain gauges 11 and 14 are, for example, elongated while the gauges 12 and 13 are contracted. The four strain gauges are connected together in the measuring bridge shown in Fig. 2. The bridge is supplied from a voltage supply 19, which supplies a direct voltage or alternating voltage U, by means of slip rings. The strain gauges 11 and 13 are connected together at one end and the strain gauges 12 and 14 are also connected together at one end. The free ends of the strain gauges 11 and 12 are connected together at 15 and the corresponding ends of the strain gauges 13 and 14 are interconnected at 16. The measuring voltage $\Delta U$ is taken between the points 15 and 16 and supplied, through slip rings, to a measuring instrument, a reference bridge or the like. The diagonal or measuring voltage $\Delta U$ may advantageously be supplied to a direct-reading and self-balancing recording compensator which is connected to a recording apparatus, for example a dot printer.

Figure 3:
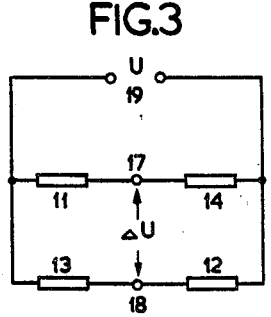
Fig. 3 is a schematic diagram of an embodiment of a testing bridge arrangement of the strain gauges of Fig. 1.

In order to check the zero constancy, the measuring bridge is changed over into a testing bridge. The testing bridge is shown in Fig. 3. With respect to the arrangement shown in Fig. 2, the strain gauges 12 and 14 are interchanged. Thus, each bridge arm comprises the series-connection of two gauges which are subjected to the same deformation. Between their junctions 17 and 18, respectively, the diagonal voltage can be derived. When the electrical values of the strain gauges and of the balancing elements have not changed, this diagonal voltage is zero. If, however, there is a zero shift, a corresponding voltage is set up between the terminals 17 and 18.

Figure 3A:
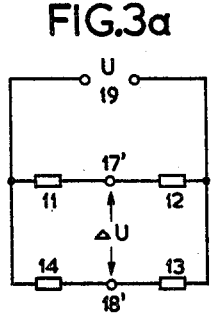
Fig. 3a is a schematic diagram of an arrangement equivalent to the arrangement shown in Fig. 3.
Figure 4:
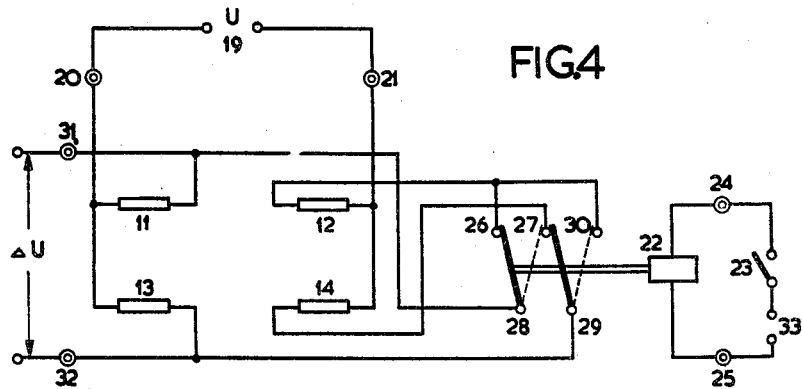
Fig. 4 is a schematic diagram of an embodiment of a bridge arrangement and of the change-over device and its connection within the bridge in accordance with the present invention.

With large rotating marine screw propeller shafts, a relay which acts as a change-over device can be provided on the shaft and be connected in the manner shown in Fig. 4. The two terminals of the voltage source 19 supplying the bridge are connected, through slip rings 20 and 21, to the interconnected ends of the pairs of strain gauges 11, 13 and 12, 14. The other ends of the strain gauges 11 and 13 are connected to slip rings 31 and 32, respectively, from which the diagonal voltage $\Delta U$ is taken. In the measuring bridge, this diagonal voltage is the measuring voltage, and in the testing bridge it corresponds to a zero variation which may have occurred. The change-over device comprises a relay, the contacts 26 to 30 of which are connected to the free ends of the strain gauges, the coil 22 of the relay being connected, through slip rings 24, 25 and a switch 23, to a voltage supply 33. The contacts 26—28—27 and 27—29—30 are change-over contacts. The free end of the strain gauge 11 is connected to the contact 28, the free end of the gauge 12 to the contacts 26 and 30, the free end of the gauge 14 to the contact 27 and the free end of the gauge 13 to the contact 29. When the switch 23 is closed, the relay 22 is energized and the measuring bridge shown is changed over into the testing bridge arrangement shown in Fig. 3. By suitably interchanging the connections to the contacts 26 to 30 and to the slip rings, the testing arrangement shown in Fig. 3a can be produced by changing over. In this arrangement, the test voltage is measured as a diagonal voltage between junctions 17' and 18'. The arrangement shown in Fig. 4 permits ascertaining at any instant whether there has been a zero shift due to any change in the electrical values of the measuring bridge attached to the shaft, without the shaft being required to be stopped. This renders the invention particularly important for measurements on marine screw propeller shafts, since these shafts frequently rotate continuously for weeks on end. When the test shows a zero shift of the measuring bridge in excess of the permissible degree of variation, the shaft can be stopped and the bridge together with the balancing elements (not shown) can be balanced. After this check or after balancing, the arrangement can again be changed over to the measuring bridge.

The zero checking of strain gauges can be used correspondingly for other strain measurements on stationary non-rotating objects, for example stanchions of roll frames in cold-rolling mills, in which even at no-load there is a bias pressure due to the rolls engaging one another. This bias pressure must be maintained during the rolling process and in the non-working intervals. For operational reasons also, it is frequently undesirable to separate the rolls for zero checking, so that zero adjustment, which otherwise is effected at zero pressure of the rolls, cannot be carried out in the intervals.

In this event also, the arrangement in accordance with the invention permits the testing of the strain gauges without interfering with normal operation.

While the invention has been described by means of a specific example and in a specific embodiment, I do not wish to be limited thereto, for obvious modifications will occur to those skilled in the art without departing from the spirit and scope of the invention.

What is claimed is:

1. A circuit arrangement comprising a plurality of electrical elements adapted to vary in electrical impedance in accordance with mechanical deformation thereof, means for connecting said elements in a first bridge arrangement, said bridge arrangement having input and output terminals, means mounting said elements on a member, means for applying a supply voltage to said input terminals, said elements being positioned on said member in a manner whereby the voltage across said output terminals is responsive to mechanical deformation of said member, the said elements being positioned in a manner whereby at least one of the said elements is deformed differently from the other of the said elements, and means for altering the connection of said elements during deformation of said member to form a second bridge arrangement having the same input and output terminals as said first bridge arrangement but with the said elements rearranged to cause the bridge output voltage to be independent of mechanical deformation of said member.

2. A circuit arrangement comprising a plurality of electrical elements adapted to vary in electrical impedance in accordance with mechanical deformation thereof, means for connecting said elements in a first bridge arrangement, said bridge arrangement comprising input terminals, a first pair of said elements connected in series circuit arrangement across said input terminals, a second pair of said elements connected in series circuit arrangement in parallel with said first pair of said elements across said input terminals and output terminals in said series circuit arrangements interposed between said first pair of elements and between said second pair of elements, means mounting said elements on a member, means for applying a supply voltage to said input terminals, said elements being positioned on said member in a manner whereby the voltage across said output terminals is responsive to mechanical deformation of said member, the elements of each pair of said elements being positioned in a manner whereby they are deformed differently from each other upon deformation of said member, and means mounted on said member for altering the connection of said elements during deformation of said member to form a second bridge arrangement having the same input and output terminals as said first bridge arrangement but with the said elements rearranged to cause the bridge output voltage to be independent of mechanical deformation of said member.

3. A circuit arrangement comprising a plurality of electrical elements adapted to vary in electrical impedance in accordance with mechanical deformation thereof, means for connecting said elements in a first bridge arrangement, said bridge arrangement having input and output terminals, means mounting said elements on a member, means for applying a supply voltage to said input terminals, said elements being positioned on said member in a manner whereby the voltage across said output terminals is responsive to mechanical deformation of the said member, the said elements being positioned in a manner whereby at least one of the said elements is deformed differently from the other of the said elements, and electromagnetic relay means mounted on said member for altering the connection of said elements to form a second bridge arrangement having the same input and output terminals as said first bridge arrangement but with the said elements rearranged to cause the bridge output voltage to be independent of mechanical deformation of said member.

4. A circuit arrangement comprising a plurality of electrical elements adapted to vary in electrical impedance in accordance with mechanical deformation thereof, means for connecting said elements in a first bridge arrangement, said bridge arrangement having input and output terminals, means mounting said elements on a rotatable member, a first pair of slip rings mounted on said member and connected to said input terminals, means for applying a supply voltage to said first pair of slip rings, said elements being positioned on said member in a manner whereby the voltage across said output terminals is responsive to mechanical deformation of the said member, the said elements being positioned in a manner whereby at least one of the said elements is deformed differently from the other of the said elements, a second pair of slip rings mounted on said member and connected to said output terminals, and means mounted on said member for altering the connection of said elements during rotation of said shaft to form a second bridge arrangement having the same input and output terminals as said first bridge arrangement but with the said elements rearranged to cause the bridge output voltage to be independent of mechanical deformation of said member.

References Cited in the file of this patent

UNITED STATES PATENTS

| | | |
|---|---|---|
| 2,152,556 | Messinger | Mar. 28, 1939 |
| 2,180,176 | Stone | Nov. 14, 1939 |
| 2,392,293 | Ruge | June 1, 1946 |
| 2,423,620 | Ruge | July 8, 1947 |